No. 626,075. Patented May 30, 1899.
C. H. MOCK & G. W. SMEAD.
COMBINATION SLIP JOINT.
(Application filed Mar. 22, 1898.)
(No Model.)
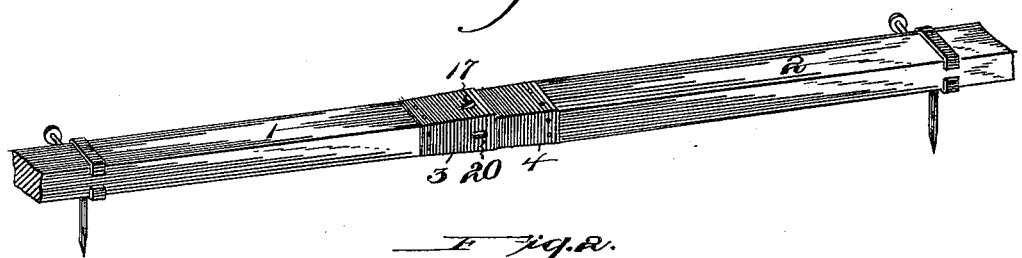
Fig. 1.
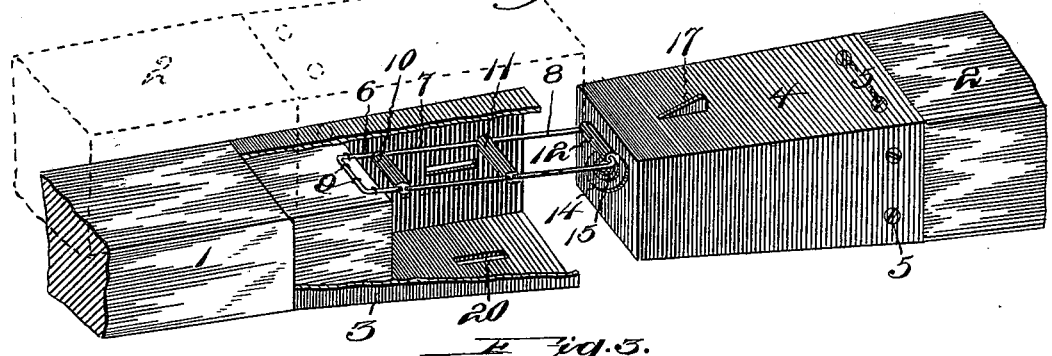
Fig. 2.
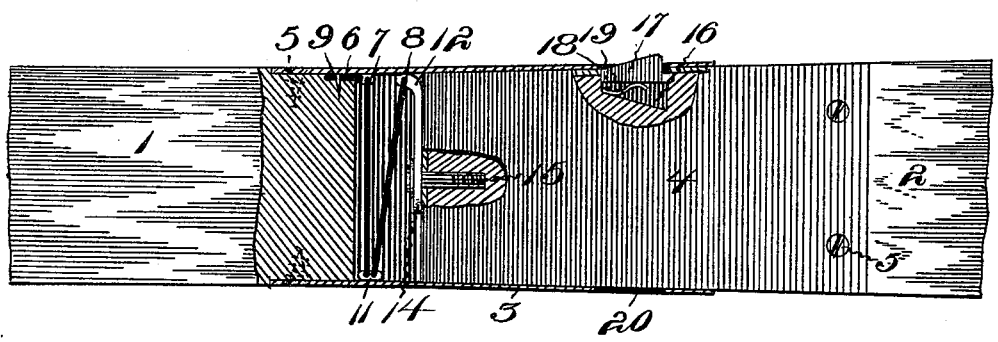
Fig. 3.
Fig. 4.
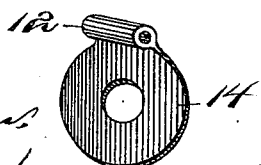
WITNESSES:
J. P. Appleman
Arthur Haymaker
INVENTORS
Charles H. Mock.
George W. Smead.
BY
H. C. Everts & Co.
ATTORNEYS
THE NORRIS PETERS CO., PHOTO-LITHO., WASHINGTON, D. C.

UNITED STATES PATENT OFFICE.

CHARLES H. MOCK AND GEORGE W. SMEAD, OF PITTSBURG, PENNSYLVANIA.

COMBINATION SLIP-JOINT.

SPECIFICATION forming part of Letters Patent No. 626,075, dated May 30, 1899.

Application filed March 22, 1898. Serial No. 674,751. (No model.)

*To all whom it may concern:*

Be it known that we, CHARLES H. MOCK and GEORGE W. SMEAD, citizens of the United States of America, residing at Pittsburg, in the county of Allegheny and State of Pennsylvania, have invented certain new and useful Improvements in Combination Slip-Joints, of which the following is a specification, reference being had therein to the accompanying drawings.

This invention relates to certain new and useful improvements in slip-joints; and it has for its object to combine novel and effective means whereby two sections of an instrument or object may be rigidly connected together, so as to cause the same to act as one piece.

The invention aims to provide a novel coupling or joint of this form whereby the sections may be readily disconnected and folded together when desired.

The further object of the invention is to construct a slip joint or coupling which will permit the turning of the one section independently of the section to which it is connected.

The principal features of our invention comprise the two ferrules or sleeves, which are of substantially the same shape, being somewhat tapered, and which are adapted to engage one within the other. To the inner end of one section is attached a link, which is connected by other links to the swiveled washer or eyelet that is attached to the engaging section. These links are adapted to fold within the one sleeve or ferrule as the sections are brought together, and when the one sleeve or ferrule has entered within the twin or engaging sleeve or ferrule to the limit thereof the same is held in engagement therewith by means of spring-actuated lugs, which engage in the eyelets provided therefor in the receiving ferrule or sleeve.

In describing the invention in detail reference is had to the accompanying drawings, forming a part of this specification, wherein like figures of reference indicate similar parts throughout the several views, in which—

Figure 1 is a perspective view of a trammel-stick to which our invention is applied. Fig. 2 is an enlarged perspective view showing a portion of the two sections and with one sleeve or ferrule partly broken away to show the position of the links when the two sections are disjointed. Fig. 3 is a vertical sectional view of the two sections when joined together. Fig. 4 is a perspective view of the swiveled washer by means of which the links are connected to the entering section.

Although we have shown the invention herein as applied to a trammel-stick, yet we do not wish to be understood as limiting ourselves to or claiming this specific application, as we have merely shown this in order to illustrate how two sections of an instrument may be joined together by the use of our invention.

The device may be used for tent-poles or various other purposes, the joint being applied and used in the same manner as herein shown upon a trammel-stick. For the purpose of illustration, however, we will use the trammel-stick and designate the two sections thereof as 1 and 2. The inner ends of these sections are slightly chamfered or reduced, so as to receive the two sleeves or ferrules 3 and 4, the former of which engages upon the chamfered end of the section 1 with its reduced end and has its enlarged end extending some distance beyond the engaging end of the section 1, and the latter of which engages the chamfered end of the section 2 with its enlarged end and is adapted to telescope within the extending portion of the ferrule 3. Both sleeves or ferrules may be secured to the sections by means of screws or rivets 5, which are preferably countersunk, so as to be at least flush with the face of the sleeves and sections. These two sleeves and ferrules being of substantially the same shape and secured upon the sections so that their smaller ends are projecting in the same direction, it will be observed that the ferrule or sleeve 4 will readily enter within the ferrule or sleeve 3 until the outer wall of the sleeve or ferrule 4 comes in frictional contact with the inner wall of the sleeve or ferrule 3, where it will be locked by the spring-actuated locks, to be hereinafter described. The sections are connected together by means of the links 6, 7, and 8, the former of which may have its one end secured to the reduced end of the section 1 by staples 9 or by any other suitable means, the other end of this link 6 engaging in a keeper 10, which likewise receives one end of the link 7, the other end of said link 7 engaging in keeper 11, which likewise receives the one end of the link 8. The other end of this link 8 engages in the keeper or eyelet 12, formed therefor upon the washer 14, the latter being swiveled or otherwise loosely mounted upon a screw 15, projecting into the inner end of the section 2. This screw 15 being rigid and the washer 14 being swiveled thereon, it will be observed that the section 2 may revolve independently of the section 1, so as to cause any of the sides to register that may be desired. For the purpose of holding the sections in engagement we provide the sections 2 with recesses 16, in which are pivotally secured inclined lugs 17, protruding through the slots 18, provided therefor in the ferrule or sleeve 4. These lugs are held normally extended by means of the springs 19, arranged within the recesses 16 and engaging on the underneath face of the lugs. As the sleeve or ferrule 4 enters within the sleeve or ferrule 3, these lugs 17 are compressed within the recess 16 until they are in registration with the oblong slots or eyelets 20, provided therefor at each side of the ferrule 3, at which time they would be forced outward by their springs into engagement with the said slots or eyelets. Thus it will be observed that we may provide but one of these spring-actuated lugs, and by providing the four receiving slots or eyelets in the ferrule or sleeve 3 the sections may be locked without respect to any particular registration of the same. The section 4 may, however, if desired, be provided with two or more of the spring-actuated lugs. As the sections are thus joined together it will be observed that the links 7 and 8, which are less in length than the diameter of the ferrule or sleeve 3, and by reason of their being swiveled in the keepers, will readily fold so as to permit the joining of the sections, and when the spring-lugs are released and the sections forced apart these links will extend to the horizontal position.

While the foregoing appears to embody the preferred form of our invention, yet we do not wish to limit ourselves to the exact construction as herein shown and described, as various changes may be made in the details without departing from the general spirit of our invention.

Having fully described our invention, what we claim as new, and desire to secure by Letters Patent, is—

1. In a slip-joint, the combination of the two adjacent sections, a tapered ferrule secured to the engaging end of each section, one of said ferrules extending beyond the end of the section and adapted to receive the ferrule of the opposing section in telescopic engagement, a swivel secured to the end of one section and a series of links connecting said swivel with the opposing section, substantially as shown and described.

2. In a slip-joint, the combination of two adjacent sections having tapered ferrules secured on their engaging end, one of said ferrules extending beyond the section and adapted to receive the opposing ferrule in telescopic engagement, connections between said sections, a spring-operated lug arranged in one of said sections and operating through the ferrule thereon, the engaging ferrule being provided with slots to receive said lug and hold the ferrules in engagement, substantially as shown and described.

3. In a slip-joint, the combination of two engaging sections having ferrules secured on their engaging end, one of said ferrules projecting beyond the section to which it is secured and adapted to receive the opposing ferrule in telescopic engagement, a series of links connected together to form a chain having one end rigidly attached to one section, a swivel secured to the adjacent section to receive the opposite end of said chain, and means for locking said ferrules together when in engagement, substantially as shown and described.

In testimony whereof we affix our signatures in the presence of two witnesses.

CHARLES H. MOCK.
GEORGE W. SMEAD.

Witnesses:
JOHN NOLAND,
WILLIAM E. MINOR.